United States Patent
Russell (10) Patent No.: US 7,808,621 B2
(45) Date of Patent: Oct. 5, 2010

(54) SYSTEM AND METHOD FOR IDENTIFYING FIBER OPTIC CABLES

(75) Inventor: Todd H. Russell, Sturbridge, MA (US)

(73) Assignee: Verizon New England Inc., Boston, MA (US)

( * ) Notice: Subject to any disclaimer, the term of this patent is extended or adjusted under 35 U.S.C. 154(b) by 936 days.

(21) Appl. No.: 11/495,398

(22) Filed: Jul. 28, 2006

(65) Prior Publication Data
US 2007/0025676 A1 Feb. 1, 2007

Related U.S. Application Data

(60) Provisional application No. 60/704,223, filed on Jul. 29, 2005.

(51) Int. Cl.
*G01N 21/00* (2006.01)

(52) U.S. Cl. .............. 356/73.1; 356/5.01; 356/5.14; 385/15; 385/27; 385/100; 385/134

(58) Field of Classification Search ............... 356/5.01, 356/5.14, 73.1; 385/15, 27, 39, 100–134
See application file for complete search history.

(56) References Cited

U.S. PATENT DOCUMENTS

| 7,440,087 B2 * | 10/2008 | Froggatt et al. ............ 385/13 |
| 2008/0297773 A1 * | 12/2008 | Blair et al. ............ 356/73.1 |

* cited by examiner

*Primary Examiner*—Gregory J Toatley, Jr.
*Assistant Examiner*—Iyabo S Alli (57) ABSTRACT

A system is provided including a unique marker configured to engage an unknown optical fiber and an identification device configured to selectively engage the unknown optical fiber and detect the unique marker.

A method is further provided including the steps of attaching a unique identifier to an unknown optical fiber, engaging an identification device to the unknown optical fiber, and identifying the unique identifier via the unknown optical fiber.

25 Claims, 11 Drawing Sheets

SYSTEM AND METHOD FOR IDENTIFYING FIBER OPTIC CABLES

RELATED APPLICATION

The present application claims priority to U.S. Provisional Application Ser. No. 60/704,223, titled "METHOD AND SYSTEM FOR TESTING SPLICED FIBER OPTIC CABLE," filed on Jul. 29, 2005, the contents of which are hereby incorporated by reference in their entirety.

BACKGROUND INFORMATION

A fiber optic cable "roll out" and installation requires testing of the newly laid and spliced fibers to verify that they work properly and in accordance with desired performance characteristics. As a result, testing is required, for example, to ensure that the optic cable has been installed according to specification, including the actual fiber, connections, and splices between a distribution hub to a target location. Knowing the length of each fiber between its unterminated ends as well as the clarity of the optic cable fiber is often critical. In particular, when using connections and splices, it is necessary to test the entire cable in order to determine that all of the splices or connections were appropriately accomplished without unduly degrading fiber light transmission capability. The testing is usually performed by measuring the decibel (dB) loss within a particular span of each fiber between two unterminated ends.

Typically, a multi-fiber installation requires at least two technicians to validate and test each optic cable. A first technician must be located at the target location and a second technician must be at the hub location. The technician at the target location attaches a transmission source to a particular unterminated fiber end. The other technician would then probe the other end of the optic cable with a power meter at the hub location to determine which fiber is providing optical power, e.g., the specific fiber to which the light source is connected to. Through mutual communication, the two technicians would then label the fiber at each location with a common designation. This is a time consuming and random method for determining the fiber identities, as well as being expensive in manpower and equipment. Moreover, such a manual method using more than one technician is prone to mistakes through miscommunication or accidental mis-labeling.

DETAILED DESCRIPTION OF THE PREFERRED EMBODIMENTS

An identifier system is described including a test set attached to one end of an unknown fiber, the test set having a test fiber. A technician connects an Optical Time Domain Reflectometer (OTDR) to the other end of the unknown fiber and searches for an event marker. When the event marker is found, the technician measures the distance from the event marker to the end of the test fiber. Where the end of the test fiber is unterminated, the OTDR will show the distance at which extreme attenuation occurs at the unterminated end. Where the test fiber is terminated, the OTDR will clearly show the end due to the precise end point provided by the terminator. Using the measured length of the test fiber attached to the unknown fiber as a unique characteristic, the technician now knows which fiber was tested, as only one fiber has the unique length of test fiber in the optical path. It is further contemplated that embodiments may provide a unique characteristic as a series of lossy segments along a fiber (e.g., losses generated by introducing loss to said fiber at identifiable predetermined distances from one another along the length of the test fiber). Thus, as discussed herein, the unique identifier is not limited to the length of an identifying fiber. Moreover, the methods discussed herein are not limited to measuring lengths of a unique identifier.

Figure 1:
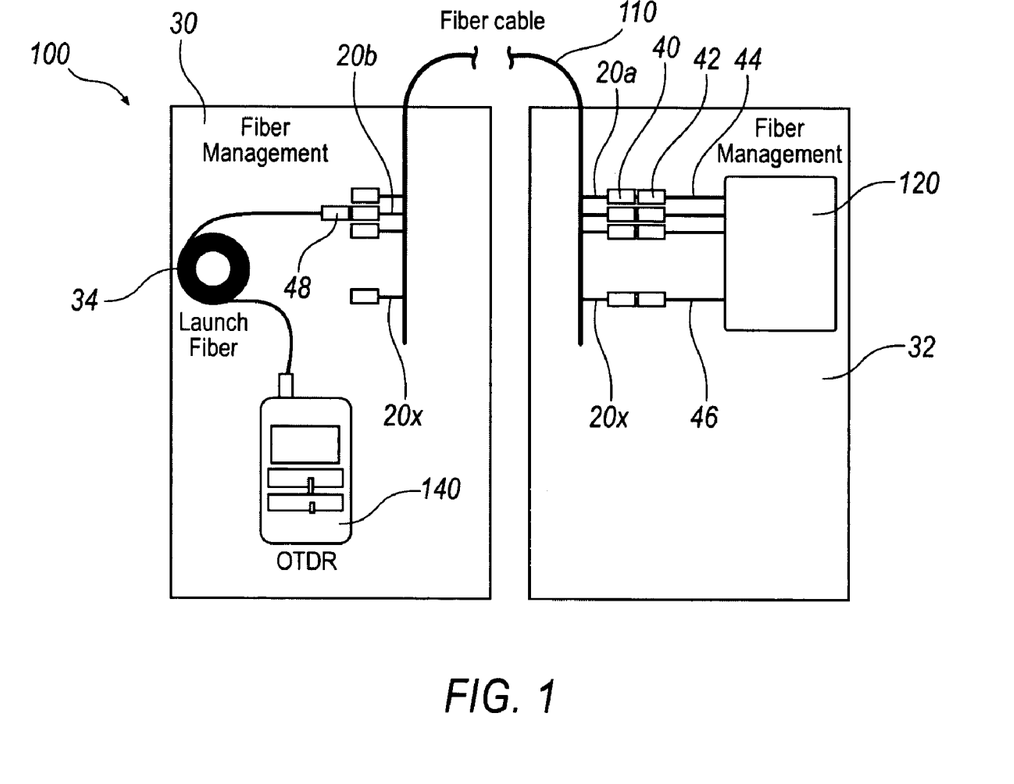
FIG. 1 shows an identifier system for strands of a fiber optic bundle, according to an embodiment.

FIG. 1 shows an identifier system 100 for unknown fibers 20a-20x of a fiber optic bundle 110, according to an embodiment. Bundle 110 connects a first hub 30 and a second hub 32 where physical access to the fiber strands of bundle 110 is provided. First hub 30 and second hub 32, respectively, may be located essentially anywhere that an end of bundle 110 is available. However, first hub 30 and second hub 32 are not necessary to identifier system 100, but rather are locations where the ends of bundle 110 are commonly provided.

In an exemplary embodiment, bundle 110 is a multiple strand fiber-optic cable having 24 individual unknown fibers 20a-20x isolated from each other. Bundle 110 may also be embodied as a single strand, or multiple strand bundle having any number of fibers routed therethrough. Moreover, bundle 110 need not be groups of individual unknown fibers 20 that are grouped together. Bundle 110 may embody a single communication fiber or multiple fibers that connect two points, such as first hub 30 and second hub 32, for example using a fiber optic bundle having the same physical routing or using multiple independent fibers having different routings. As discussed in detail below, identifier system 100 does not require a bundled fiber infrastructure to facilitate fiber identification.

At second hub 32, unknown fibers 20a-20x are connected to a test set 120. Connection is made between unknown fibers 20a-20x by connectors. In one example, unknown fiber 20a is connected to test set 120 by a first connector 40 that optically communicates with a second connector 42 and jumper 44. As shown in FIG. 1, each of unknown fibers 20a-20x are optically connected to test set 120 through separate jumpers, for example jumpers 44, 46. First connector 40 and second connector 42 are complementary components to a subscriber connector having an angled physical contact (SC/APC). The SC connector has a latching mechanism that facilitates quick insertion and removal by a technician, while at the same time ensuring a positive connection. Thus, using SC/APC jumpers 44, 46, test set 120 is quickly attached for test of bundle 110. Moreover, the optical connections associated with test set 120 and jumpers 44, 46 may be easily cleaned or replaced by virtue of the removability of jumpers 44, 46. In general, the method of attachment may be engagement of the fibers together, via jumpers, or via connectors generally.

At first hub 30, OTDR 140 is attached to an unknown fiber 20*b* as an identification device (described below in detail). Although fibers 20*a*-20*x* and 20*b* may appear to be organized and/or sequential by their numbering, identifier system 100 may be used with any random organization of fibers at either end of bundle 110. A launch fiber 34 connects OTDR 140 with unknown fiber 20*b* by an SC/APC connector 48. Because fibers 20*a*-20*x* of bundle 110 are not labeled, a technician uses test set 120 and OTDR 140 to identify each unknown fiber 20. Once test set 120 and OTDR 140 are connected to an unknown fiber 20 of bundle 110, a technician may begin testing unknown fiber 20*b* as described in detail below.

In an exemplary embodiment, the identifying method and process includes a technician that connects test set 120 to out-pairs (e.g., ends of fibers 20*a*-20*x*) of bundle 110 at second hub 32 prior to splicing a new terminal. The technician then travels to first hub 30, generally near or at a customer site, and splices the fiber cable. After the fiber pairs are spliced, the technician uses OTDR 140 to determine whether any significant loss is present in the fiber (e.g., see FIG. 5; loss 550). As shown in FIG. 3A and discussed in further detail below, the technician the identifies the fiber under test by measuring, via fiber 20, the length of identifying fiber 320 in test set 120. Because the lengths of identifying fibers 320 are of unique lengths, each identifying fiber 320 functions as a unique marker. Alternatively, although a greater chance of error exists, where the fiber under test is part of bundle 110, or all fibers under test are of the same length, the technician may identify the fiber by overall length including the test fiber. When identification of the fibers is complete, test set 120 is typically left at second hub 32 for later use.

In an alternative embodiment, the unique characteristic of identifying fiber 320 may include selective loss or reflective identifying portions at predetermined intervals. Using the identifying portions may be read by OTDR 140 to determine which identifying fiber 320 is engaged with fiber 20. In an embodiment, the selective loss or reflective portions may be encoded as binary characters (e.g., using barcode encoding). In an embodiment, encoding may be performed using the American Standard Code for Information Interchange (ASCII). Then, rather than using length, each identifying fiber 320 may be encoded with the respective input 160 (e.g., "Input 1" ... "Input 24"). OTDR 140 is programmed to read and decode the encoded information and display the input number (e.g., "Input 1"). Moreover, identifying fiber 320 may also include information that identifies a particular test set 120. OTDR 140 is programmed to read and decode the encoded information and display the input 160 number and the particular test set 120 (e.g., "Test Set 1: Input 1"). Thus, multiple test sets may be used and can be differentiated from one another by a same technician.

Figure 1A:
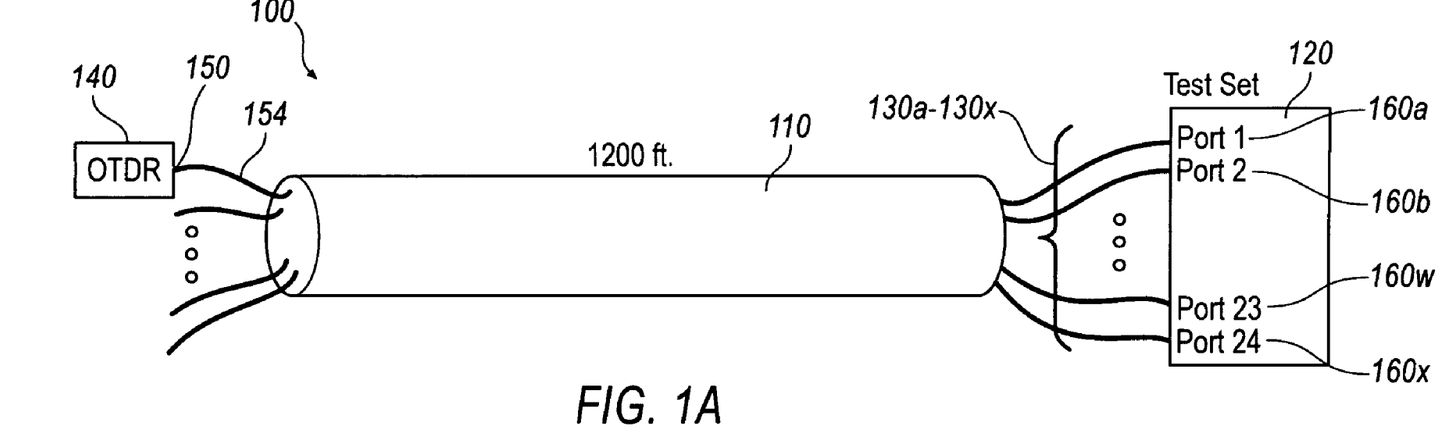
FIG. 1A shows a simplified diagram of an identifier system of FIG. 1 attached to individual fibers of fiber optic bundle and an OTDR attached to an unknown first fiber, according to an embodiment.

FIG. 1A depicts a simplified exemplary identifier system 100 using a fiber optic bundle 110 with test set 120 selectively attached to unterminated ends 130 of each fiber of bundle 110 and OTDR 140 selectively probing an opposing unterminated end 150 of a first unknown fiber 154. Typically, unterminated ends 130 are accessible to a technician at a fiber optic distribution hub (not shown), but may also be available directly from bundle 110 or at other locations in a distribution system. The system includes OTDR 140, bundle 110 of optical fibers of currently unknown length (shown to be approximately 1200 feet in the figure, but which can be of substantially shorter or longer length in accordance with the teachings of the system), and test set 120 located at the hub location where unterminated ends 130 are available for connection. Each fiber of bundle 110 is connected to a separate input, e.g., 160*a*-160*x*, of test set 120 by a technician (not shown).

OTDR 140 is an instrument for analyzing losses in an optical fiber and is typically used as a tool for testing or debugging an optical fiber system. Generally, OTDR 140 pulses a laser into a fiber and measures the returning pulses of backscatter and reflection of light as a function of time. As the transmitted light returns to OTDR 140, the light is analyzed to determine a location for losses or defects in the fiber due to breaks, damage, or ineffective splices. Moreover, the intensity of light returned is shown as a function of time and/or distance as is shown in more detail below. Identifier system 100 is not limited to using OTDR 140. Test and measurement tools other than OTDR 140 may be used to perform measurements and/or methods described herein.

Figure 2:
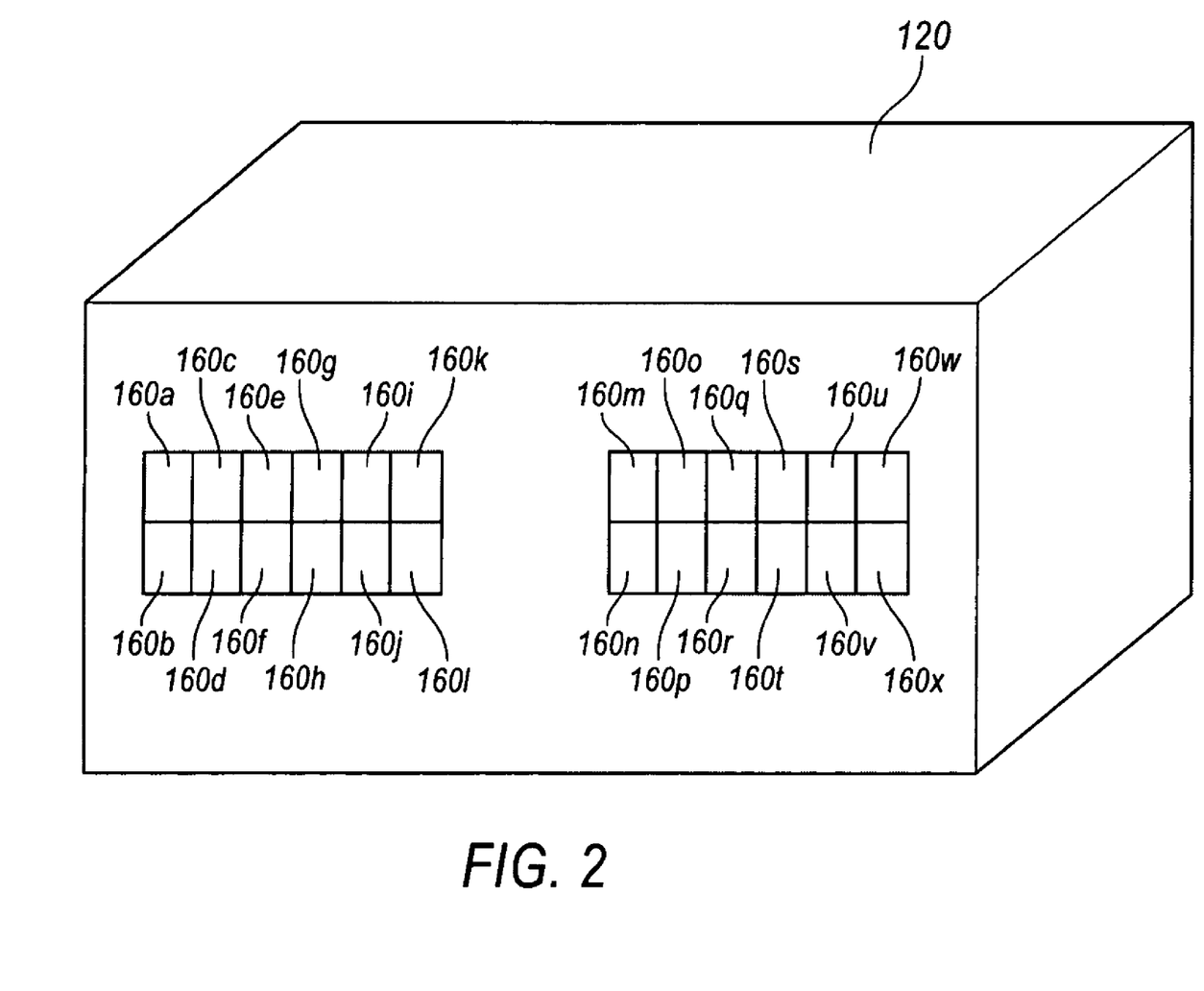
FIG. 2 shows an external connectivity view of a test set for use with the system of FIG. 1.

Turning now to FIG. 2, an exemplary embodiment of test set 120 is shown that includes twenty four inputs (e.g., 160*a*-160*x*) for identifying individual fibers of fiber optic bundle 110. Each unterminated fiber 130 of a fiber optic cable is mated to inputs 160*a*-160*x* of test set 120. Test fibers 200*a*-200*x* are associated with inputs 160*a*-160*x* and are housed within test set 120, extending away from each input 160*a*-160*x*. In the exemplary embodiment shown, each test fiber 200*a*-200*x* has a unique length and is optically connected with one of inputs 160*a*-160*x*, permitting accurate identification of a fiber connected to the input 160 as discussed below. Thus, each input 160*a*-160*x* has a unique length test fiber associated with it (i.e. no two test fibers 200 are of the same length).

Unlike typical expectations for a fiber optic connector, the mating of unterminated fiber 130 and test fiber 200*a*-200*x* (at inputs 160*a*-160*x* respectively) intentionally produces a visible event (e.g., an event perceivable to OTDR 140) at the interface between unterminated fiber end 130 and test fiber 200*a*-200*x* of test set 120 that is distinguishable from an expected normal termination that happens as part of a normal splicing or connection operation along the length of a typical fiber between two unterminated ends. The mating, however, must still be operational because, as also discussed further below, light must continue to travel within the specific mated fiber of test set 120 and ultimately be reflected back toward OTDR 140. Thus, the mating between unterminated fibers 130*a*-130*x* and test fiber 200*a*-200*x* (at inputs 160*a*-160*x* respectively) is configured to be an underperforming connection, but not so poorly performing that signals would not travel back to OTDR 140.

In alternative embodiments it is possible that a controllable visible event may be uniquely associated with each marker acting as the input such that the passage of light through each input identifies that specific input as part of the visible event (e.g., using a software driven attenuator). In any case, it is preferable that performance losses associated with the use of each input and corresponding length of the test fiber of test set 120 should be calibrated such that a determination of operational performance of the fiber under test can be readily determined.

An exemplary embodiment provides that each input to test set 120 is an SC-type fiber connection. Test set 120 includes a plurality of test fibers 200*a*-200*x* equal to the number of inputs of test set 120. Moreover, each of test fibers 200*a*-200*x* have a unique fiber length. Through the use of fibers for identification, test set 120 is entirely passive because the components used are also passive (e.g., test fibers 200*a*-200*x* and the associated inputs 160*a*-160*x*). Among other things, test set 120 requires no independent power source. As a result, the likelihood of operational failure is minimized when test set 120 is at one location representing one unterminated fiber optic cable end and a technician is at a distant location representing the other unterminated fiber optic cable end. Only routine cleaning of inputs 160*a*-160*x* is occasionally required when test set 120 is used in dirty environments.

Alternative embodiments of test set 120 may include an active identification method. An active-type of attenuator providing programmable loss in a fiber may be embodied as a "software driven attenuator." Such attenuators may be programmed to provide a predetermined loss through their optical path. Rather than using unique lengths of test fibers 200*a*-200*x*, the programmable attenuators may be connected to inputs 160*a*-160*x* and provide a unique predetermined loss at each input 160*a*-160*x*. Thus, rather than measuring the length of test fiber 200*a*-200*x*, the loss at each input 160*a*-160*x* is measured to uniquely identify the input number.

Figure 3:
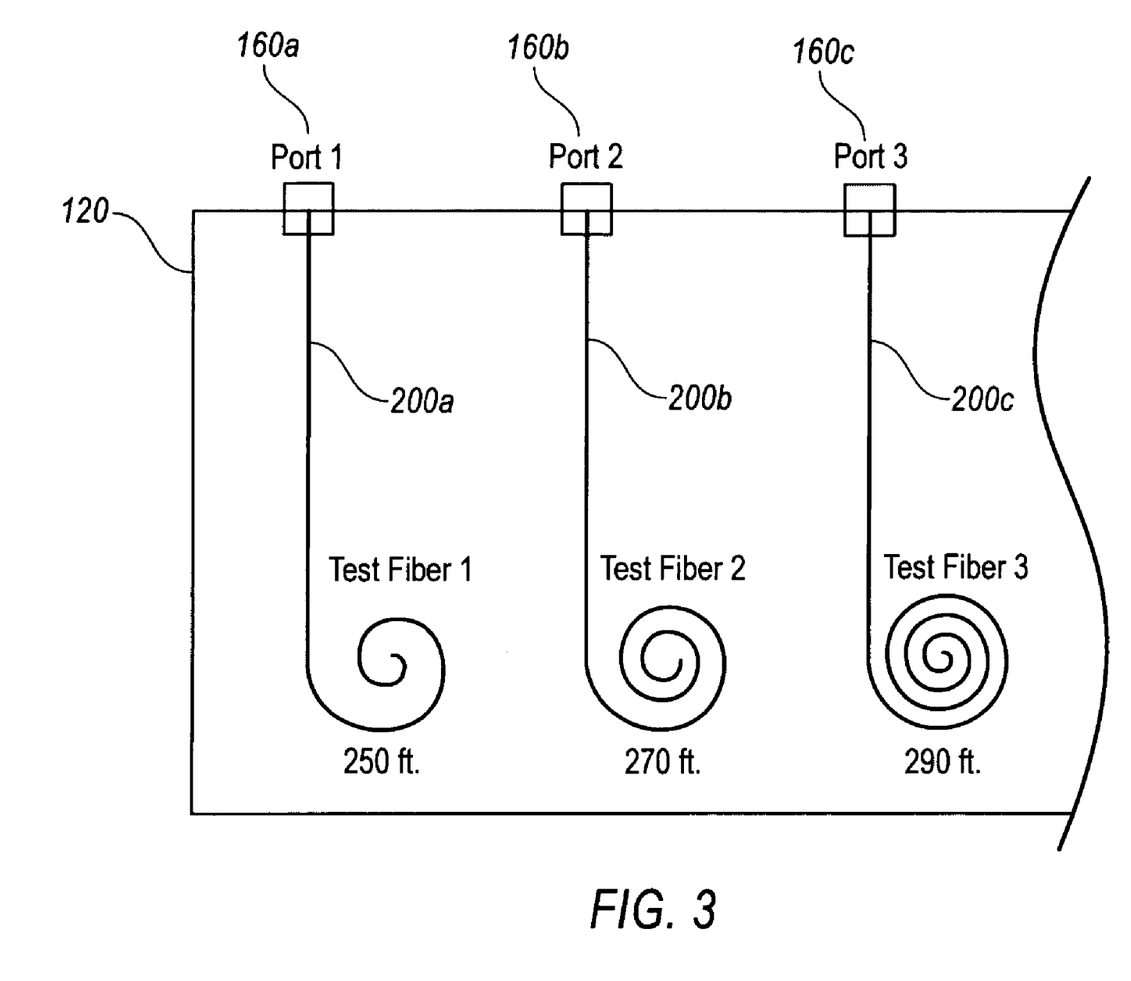
FIG. 3 shows a partial cut-away view of the test set of FIG. 2 having identifying fibers of non-equal lengths of the system of FIG. 1.
Figure 3A:
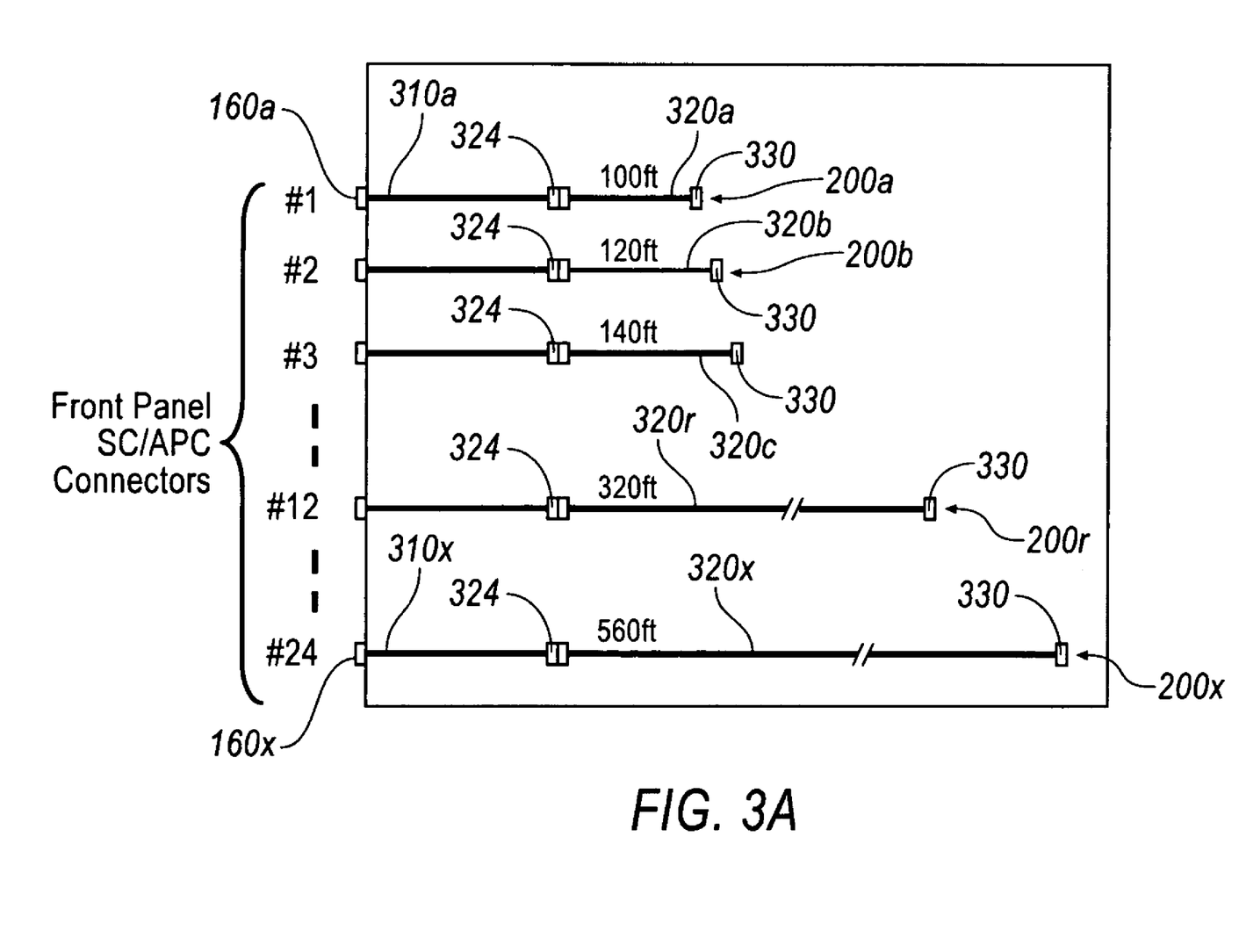
FIG. 3A shows an alternative view of the test set of FIG. 2 showing the connectors and identifying fibers.

FIG. 3 is a partial cut-away view of test set 120 having identifying fibers 200*a*-200*c* of unique lengths (i.e., non-equal lengths). Identification fibers 200*a*-200*c* are optical components and are provided in a coiled configuration to conserve volume within the housing of test set 120. Identification fibers 200*a*-200*c* function as identification components in identifier system 100. In an exemplary embodiment, test set 120 includes test fibers 200*a*-200*c* of unique lengths attached to inputs 160*a*-160*c* of test set 120. As shown, test fibers 200*a*, 200*b*, and 200*c* have respective lengths of two hundred fifty (250) feet, two hundred seventy (270) feet, and two hundred ninety (290) feet. It is understood that the remaining inputs 160*d*-160*x* also include test fibers 200 having unique lengths. The proximal end of each test fiber 200*a*-200*c* attaches to an input of test set 120. The distal end of each test fiber 200 may be left unterminated or may alternatively be terminated.

As explained above with respect to FIG. 1, to connect test set 120 to an unknown fiber, or a plurality of unknown fibers, jumper fibers (e.g., jumper 44) are connected from each input of test set 120 to each fiber line of the distribution hub or fiber optic cable.

An event marker is provided by the connection of the SC-type fiber jumper connection to the SC-type connection of test set 120. The SC-type to SC-type mating produces a reflective connection on the fiber line that is detectable by OTDR 140. Alternatively, an attenuator may be used between the unknown fiber and test fiber 200 to configure an event visible to OTDR 140. Other mechanisms for creating an event marker include introducing a defect into test fiber 200 or intentionally misaligning a splice in the test fiber 200 that produces a visible event to OTDR 140. Further, as noted above, alternative embodiments may provide specific unique mechanisms associated with each input may specifically identify that input without the need for test fibers 200 of differing length. One potential difficulty with this approach, however, is that careful control of the creation of the identifying mechanisms may be required, as well as a high resolution OTDR 140 device to discriminate the identifier may be required.

In an exemplary embodiment, identification of the unknown fiber is realized using OTDR 140 to determine the length of test fiber 200, each test fiber 200 being of dissimilar length. OTDR 140 allows a technician to determine the distance from the event marker to the end of test fiber 200. Thus, using test fibers 200 of different lengths, a technician can identify the unknown fiber by determining the distance from event marker 524 (explained in detail below with respect to FIG. 5) to the end of the test fiber 200. By labeling of the known fibers at the distribution hub by their respective connection to inputs 160, a technician may then identify each fiber line at the target site using OTDR 140.

The various lengths of each test fiber 200 are determined in part by the precision of the measuring equipment. For example, OTDR 140 may have a length precision of fifteen (15) feet. Thus, including a margin for error, the length of each test fiber should be at least sixty (60) feet in order for the technician to identify the different distances from each event marker to the end of the corresponding test fiber 200. The increment in lengths of the test fibers may also be extended to provide for the variations in the manner that technicians read OTDR 140.

In practice for a lower precision OTDR 140, the shortest length of test fiber 200 is determined to be twelve hundred (1200) feet and a length increment of three hundred (300) feet is used for each successive test fiber. For example, the lengths of a set of test fibers would be twelve hundred (1200), fifteen hundred (1500), eighteen hundred (1800), and twenty one hundred (2100) feet for a four input test set 120. However, using longer lengths for test fiber 200 adds mass to test set 120 and typically requires larger case. Using higher resolution OTDR 140, the shortest length of test fiber is determined to be sixty (60) feet and a length increment of fifteen (15) feet is used for each successive test fiber. Thus, the lengths of a set of test fibers would be sixty (60), seventy five (75), ninety (90), and one hundred five (105) feet for a four input test set 120.

FIG. 3A is an alternative view of test set 120 of FIG. 2 showing the connectors and test fibers 200*a*-200*x* as laid out in a twenty four (24) input 160 test set 120. Identification fiber 200*a* begins at input 160*a* and includes a lead-in fiber 310*a*, an event marker 324, a identifying fiber 320*a*, and a terminator 300. As described in detail below, test fiber 200*a* is uniquely identified by events visible to OTDR 140 and the respective lengths of lead-in fiber 310*a* and unique-length identifying fiber 320*a*. As shown, each input 160*a*-160*x* includes a similar configuration, but also has a unique-length fiber 320*a*-320*x* (each having unequal lengths) assigned to inputs 160*a*-160*x*.

In the exemplary embodiment shown, unique-length identifying fibers 320*a*-320*x* are shown beginning at one hundred (100) feet for unique-length identifying fiber 320*a* and incrementing twenty (20) feet per fiber 320 (that also corresponds to an input 160) and ending with unique-length identifying fiber 320*x* at three hundred twenty (320) feet. Input 160*a*, event marker 324, and terminator 330 are visible to OTDR 140. For the purposes of identifying a specific test fiber 200 (or input 160 to test set 120), OTDR 140 may look to a general pattern provided by test fiber 200. For example, an event created when testing unknown fiber 20*b* is provided by the connection at input 160*a*. Further, a known length of fiber is presented by lead-in fiber 310*a*. A second event is provided by event marker 324 and a second length of fiber is presented by unique-length test fiber 200*a*. Finally, an event is provided by terminator 300.

Thus, OTDR 140 views the events and lengths as a trigger to identify the attached unknown fiber 20*a*. For the purposes of specifically identifying unknown fiber 20*a*, OTDR 140 measures the length of unique-length identifying fiber 320*a*, in this case one hundred (100) feet. Thus, through the identification process, as explained in more detail below, the technician now knows that unknown fiber 20a is attached to input 160a of test set 120. For each unknown fiber 20a-20x, a technician may use the measurements of OTDR 140 to determine which input 160a-160x an unknown fiber 20a-20x is attached to. Thus, a mapping may be made of each unknown fiber 20a-20x.

In an alternative embodiment, lead-in fibers 310 and event markers 324 may be omitted and identification fibers 320 may be directly connected to inputs 160. The measurement of identification fiber 320 then begins at input 160 and ends at terminator 330. However, removing lead-in fibers 310 and event markers 324 may increase misidentification of fibers due to errant measurement of a length of fiber that is believed to be identification fiber 320.

Figure 4:
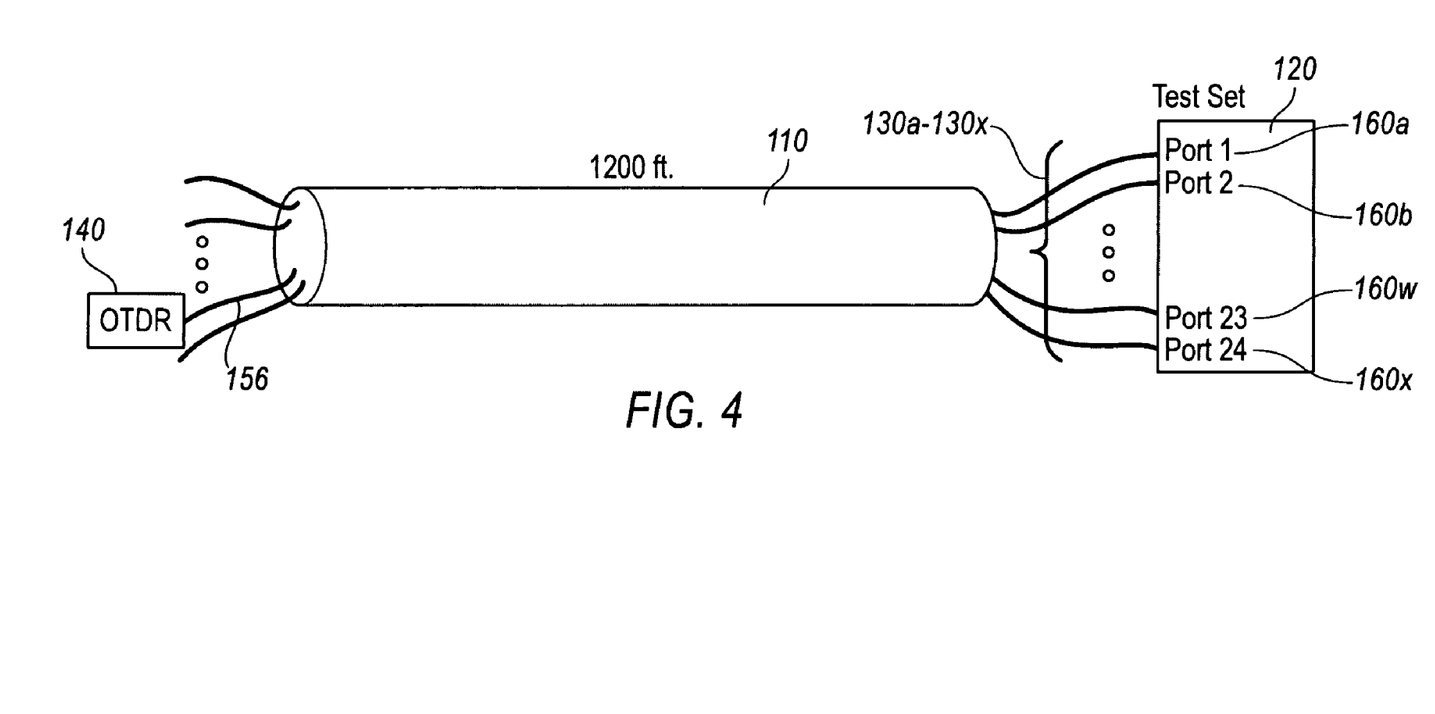
FIG. 4 shows an OTDR attached to an unknown second fiber of the system of FIG. 1.

FIG. 4 shows an OTDR attached to an unknown second fiber of the system of FIG. 1. Here, in comparison to FIG. 2, a technician has attached OTDR 140 to a second unknown fiber 156. Using the measurements from OTDR 140, the technician will determine to which of inputs 160a-160x second unknown fiber 156 is connected to, thereby identifying second unknown fiber 156. The method of identifying second unknown fiber 156 using OTDR 140 is described in detail below.

Figure 5:
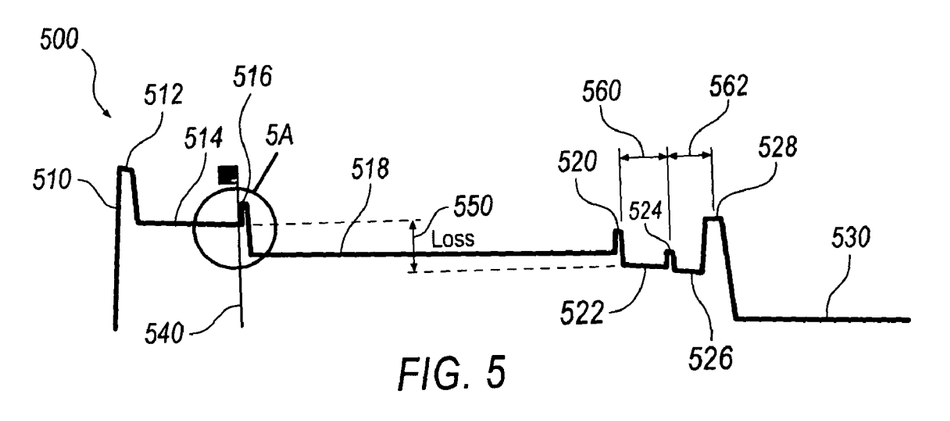
FIG. 5 shows the measurement of a fiber under test using an OTDR.

FIG. 5 shows the measurement of a fiber under test, e.g. an unknown fiber 20, using OTDR 140. The display of OTDR 140 includes a trace 500 showing distances and events (e.g., reflections). Trace 500 begins at first reflection 510 and launch fiber connection event 512. Fiber connection event 512 is provided by the connection of OTDR 140 and launch fiber 34 (shown in detail in FIG. 1). Trace 500 then includes a launch fiber length 514 that is the length of launch fiber 34. A fiber connection event 516 is provided by the connection of launch fiber 34 and unknown fiber (e.g., see unknown fiber 20b of FIG. 1). The length 518 of unknown fiber 20 is shown including a loss 550 (e.g., a transmission loss). Given a measurement of transmission loss 550, a technician may detect problems with unknown fiber 20 during the identification process.

The process of identifying a fiber begins at the end of length 518 and an input event 520 is presented by the connection of unknown fiber 20 to input 160 of test set 120. Input event 520 presents at the connection of unknown fiber 20a and connections between first connector 40 and second connector 42, shows in FIGS. 1 and 3. A length 522 is then presented on trace 500 followed by an identification event 524. Identification event 524 is provided by event marker 324 following lead-in fibers 310 (shown in detail in FIG. 3). A lead-in length 560 is measured as the length between input event 520 and identification event 524. An identification trace 526 follows identification event 524 and is followed by a termination event 528 provided by termination 330. Trace 500 then shows a finishing trace 530 following termination event 528.

An identification length 562 is measured as the length between identification event 524 and termination event 528. Identification event 562 is used to determine which input unknown fiber 20 is attached to at test set 120. However, identifier system 100 may include detection events and measurement of lengths to ensure that indeed unknown fiber 20 is attached to OTDR 140 and is further attached to test set 120. Otherwise, any number of fibers presented at first hub 30 may be improperly tested. By verifying the appropriate sequence of events, including the known launch fiber length 514, events 520, 524, 562, and the associated measured lengths 560, 562, a technician may be confident that the fiber under test is also attached to test set 120.

Figure 5A:
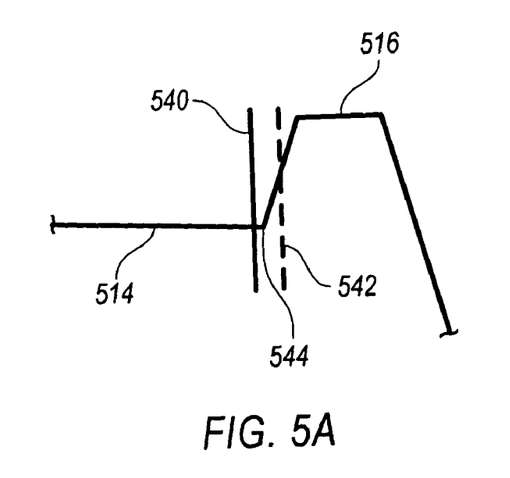
FIG. 5A shows a detailed view of proper measurement of an event in a fiber under test.

FIG. 5A shows a detailed view of the proper measurement of an event in a fiber under test. When manually measuring lengths 560, 562, for example, appropriate measurement techniques for OTDR 140 should be followed. This is because, in an exemplary embodiment, the unique distances differentiating identifying fibers 320a-320x are twenty (20) feet. Therefore, when moving from launch fiber length 514 to an event 516, the correct measurement 540 is taken immediately before event 516 occurs at event starting point 544. An improper measurement point 542 is shown midway between event starting point 544 and event 516. Because the unique distances differentiating identifying fibers 320a-320x are small, care should be taken so as to avoid misidentifying fibers.

Figure 6:
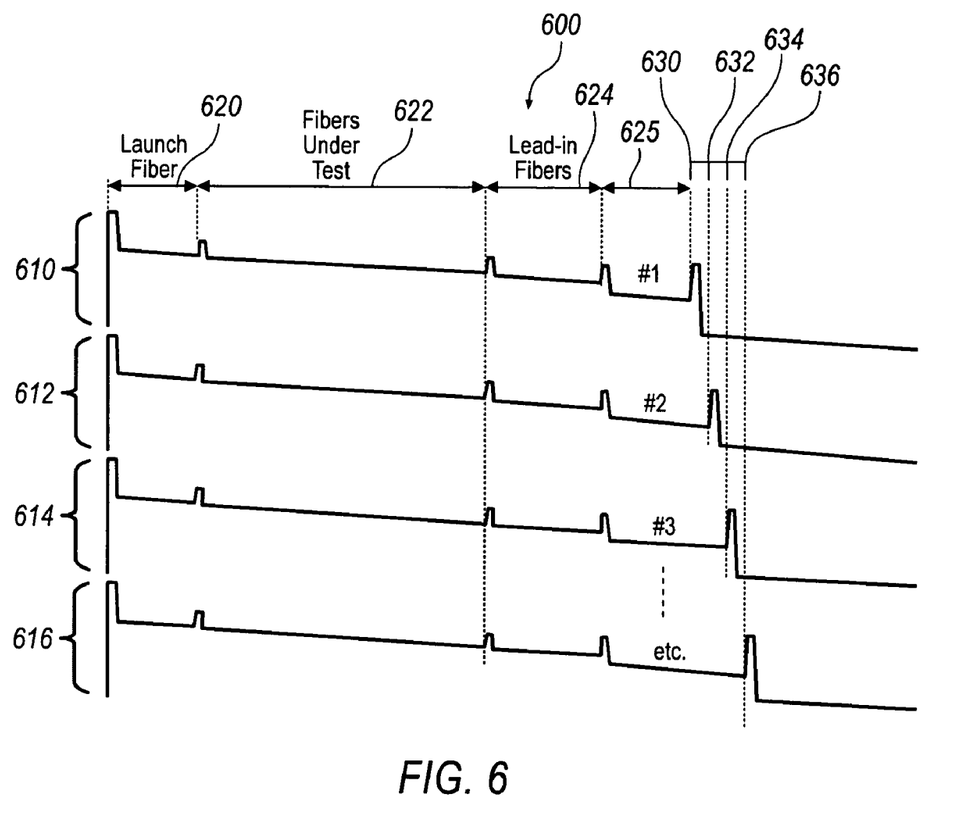
FIG. 6 shows a trace using an OTDR of multiple fibers using the identifier system of FIG. 1.

FIG. 6 shows multiple OTDR traces 600 of multiple fibers using the identifier system of FIG. 1. Shown are a first trace 610, a second trace 612, a third trace 614, and an $n^{th}$ trace 616. As shown, each trace 610, 612, 614, 616 includes the same launch fiber length 620 provided by launch fiber 34 (refer to FIG. 5 for specific event names). Furthermore, in an exemplary embodiment, each trace 610, 612, 614, 616 is provided for a fiber in bundle 110 and the length 622 is thus substantially the same for each fiber. However, it is possible to have different lengths 622 for fibers of the same bundle 110 if the individual unknown fibers 20 are not all cut together (e.g., all fibers are not cut at the same time or are later trimmed). In alternative embodiments, each fiber under test may be independent and/or part of multiple bundles 110 in which case length 622 will not be the same for each fiber.

Farther along the fiber, past fiber length 622, a lead-in fiber length 624 is shown and a nominal length 625 for identifying fiber 320 is shown. If for example, trace 610 is connected to input 160a of test set 120 (shown in FIG. 3A), nominal length 520 is one hundred (100) feet. Where trace 612 is connected to input 160b of test set 120, an incremental length of twenty (20) feet is shown as the distance from the end of nominal length 625 and termination event 528, and the overall length is one hundred twenty (120) feet. Each successive trace 614 and 616 may then be identified by the overall length of identifying fiber 320. As shown in FIG. 6 for clarity, the incremental lengths 632, 634, 636 are shown to differentiate each trace for identification rather than the overall lengths of identifying fibers 320. The identification process is shown below in detail with respect to FIGS. 7 and 8.

Figure 7:
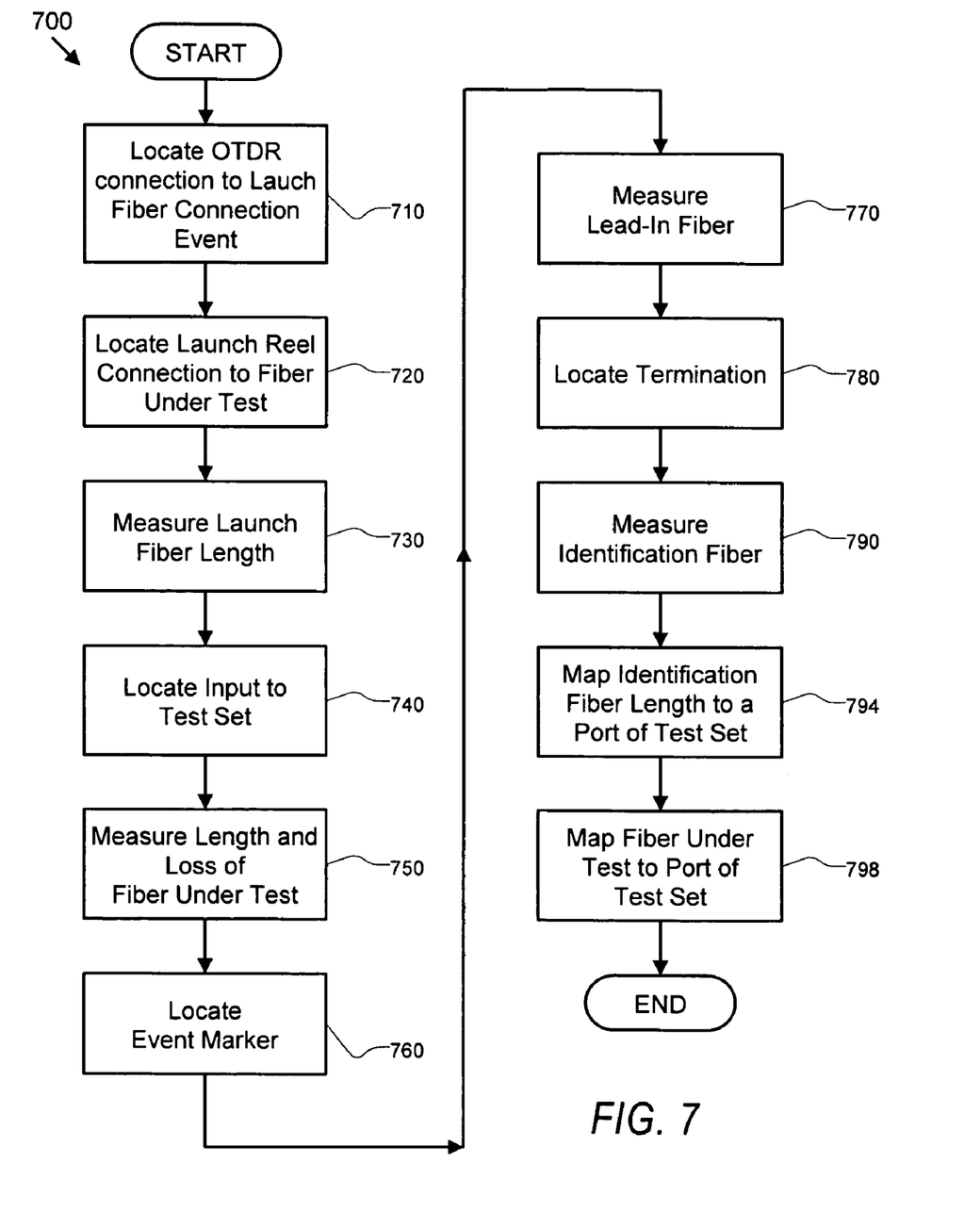
FIG. 7 shows a flow diagram of an identification process for the fiber identifier system of FIG. 1.

FIG. 7 is a flow diagram of a trace identification process 700 for the fiber identifier system of FIG. 1. Trace identification process 700 is used as a subset of other test procedures (described in detail below with respect to FIG. 8). A trace, such as trace 500 shown in FIG. 5, is provided by OTDR 140 or comparable equipment. Trace identification process 700 begins at step 710 where an OTDR 140 connection to launch fiber 34 is located. The connection of OTDR 140 to launch fiber 34 is shown in FIG. 5 as launch fiber connection event 512. Once identified, a technician and/or the identification device (e.g., OTDR 140) knows that launch fiber connection event 512 is the starting point for identifier system 100. Control then proceeds to step 720.

In step 720, the connection of launch fiber 34 to the fiber under test is located. In FIG. 5, the connection of launch fiber 34 to the fiber under test is identified by fiber connection event 516. Control then proceeds to step 730.

In step 730, the length of launch fiber 34 is measured. Given launch fiber connection event 512 and fiber connection event 516, the distance of launch fiber 34 may be measured as the distance therebetween. Although not critical to trace identification process 700, the measurement of launch fiber 34 may be used to further reinforce that OTDR 140 is properly connected to identifier system 100. Control then proceeds to step 740.

In step 740, the connection of the fiber under test to an input 160 of test set 120 is located. Input 160 may be any one of inputs 160a-160x. As shown in FIG. 5, the connection of the fiber under test to an input 160 of test set 120 is shown as input event 520 that is typically the first event past fiber connection event 516. Although the fiber under test may be spliced at some point along its length, the identifying device (e.g., OTDR 140) is able to distinguish a splice from fiber connection event 516 as a low level of reflection. Otherwise, the splice is likely out of tolerance and the fiber under test requires maintenance or replacement. Control then proceeds to step 750.

In step 750, a measurement of the length and loss of the fiber under test is performed. Although an optional step, length and loss measurements allow a technician and/or diagnostic tool (e.g., OTDR 140) to verify that the fiber under test is performing within a specification. If the fiber is underperforming, the technician may note the fiber for later repair, replacement, or decommissioning. Moreover, by way of measuring the length of the fiber under test, which is typically at least two orders of magnitude longer than launch fiber 34, a technician or diagnostic tool further verifies the segment being measured is indeed one of the desired fibers (e.g., the fiber under test). Control then proceeds to step 760.

In step 760, event marker 324 is located. As shown in FIG. 6, event marker 324 is shown on trace 500 by identification event 524. Control then proceeds to step 770.

In step 770, the length of lead-in fiber 310 is measured. The distance between input event 520 and identification event 524 is the length of lead-in fiber 310. By measuring lead-in fiber 310 and verifying the correct length, a technician and/or identification device (e.g., OTDR 140) is able to determine and verify that the segment being inspected is indeed the lead-in fiber 310. If the measurement taken for lead-in fiber 310 is either too short or too long, then the technician and/or identification device will know that an input 160 of test set 120 is not attached at the other end of the fiber under test. In this case, the test should be aborted and another fiber selected for test. Control then proceeds to step 780.

In step 780, termination 330, if any, is located. A termination event 528 is shown on trace 500 and is the last event of interest. If identifying fiber 320 is not terminated, the identification device will show extreme attenuation at the unterminated end and termination event 528 is thereby indicated. Control then proceeds to step 790.

In step 790, identifying fiber 320 is measured. As shown in FIGS. 3A and 6, each identifying fiber 320 has a unique length with respect to any other identifying fiber 320. The length of identifying fiber 320 is determined as a measurement between identification event 524 and termination event 528. Control then proceeds to step 794.

In step 794, the measured length of identifying fiber 320 is mapped to input 160 of test set 120 based on the known length of identifying fibers 320a-320x. Moreover, in an exemplary embodiment, a mapping table provides a length of identifying fiber 320 for each input 160. When the length of an identifying fiber 320 is determined through the measurement of the length between identification event 524 and termination event 528 as shown in step 790, then the input 160 is also determined and is then known. Control then proceeds to step 796.

In step 796, the fiber under test is mapped to the input 160 determined in step 794. Because input 160 is known to be attached to the fiber under test, the fiber may be previously marked with unique identifiers (e.g., numbers) at the end attached to test set 120 at the terminal determined in step 794, as well as marking the end attached to the identifying device. In this way, both ends of the fiber under test have been physically identified. The end at first hub 30 is identified as the fiber connected to OTDR 140. The end at second hub 32 is identified and determined as the fiber attached to input 160 determined above with respect to step 790 and step 794.

In general, test set 120 includes unique lengths of identifying fiber 320 for each input 160. In an embodiment, each input 160 to test set 120 is marked with the length of the corresponding identifying fiber 320. For example, where input 160a includes an identifying fiber 320a having a length of 100 feet, input 160a may be marked as "100 feet." Thus, the marking on input 160a may exactly specify the length of identifying fiber 320. When trace identification process 700 is used, OTDR 140 is connected to the fiber under test and measures the length of identifying fiber 320. Thus, the end of the fiber under test is known as the fiber connected to input 160 of test set 120 having the measured length of identifying fiber 320. Trace identification process 700 then ends.

Figure 8:
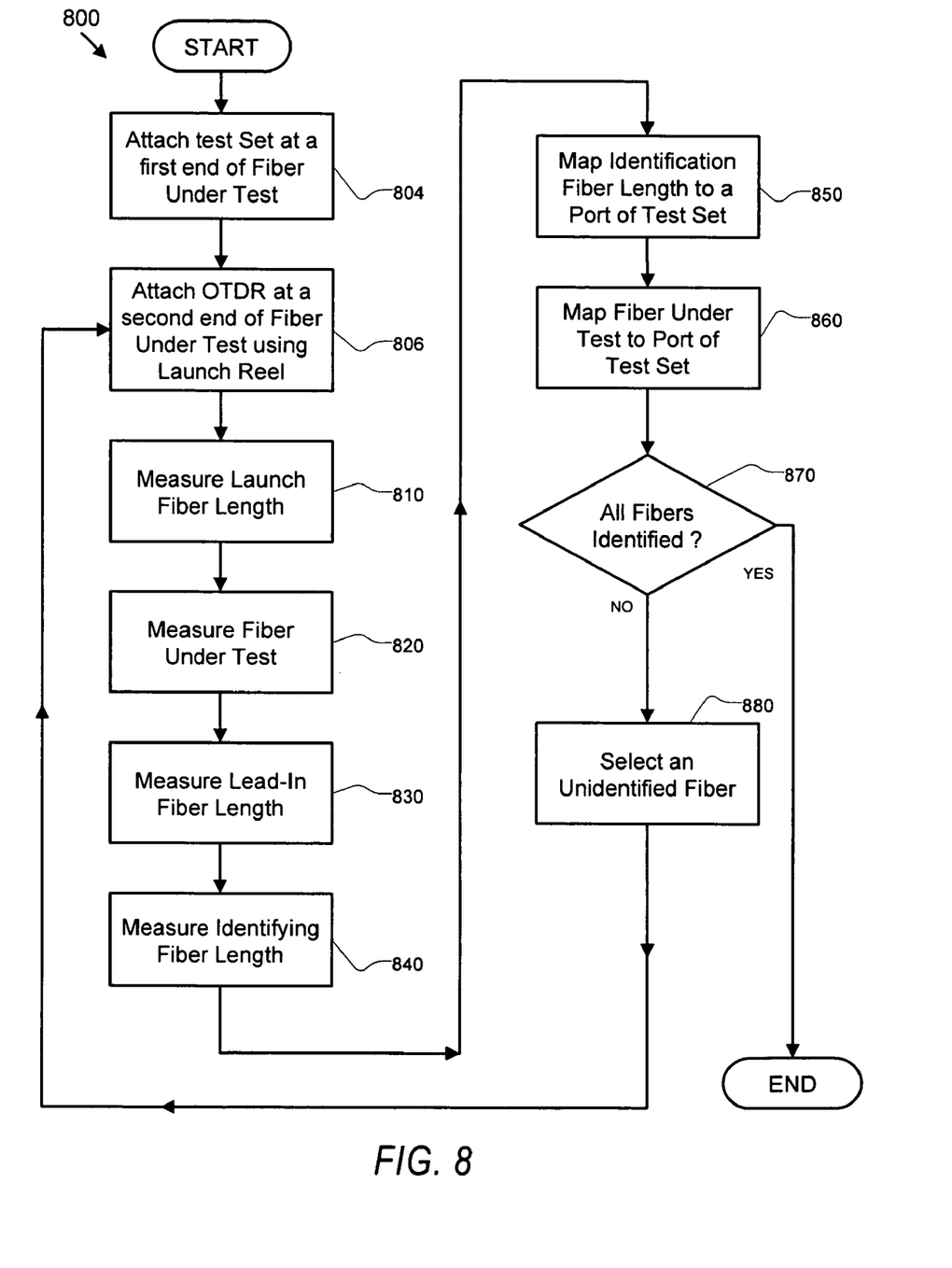
FIG. 8 shows a flow diagram of a unidirectional test procedure for use with the fiber identifier system of FIG. 1.

FIG. 8 is a flow diagram of a unidirectional test procedure 800 for use with the fiber identifier system of FIG. 1. Unidirectional test procedure 800 may be used by a single technician to identify fibers from bundle 110. Unidirectional test procedure 800 described in detail here is from the standpoint of a technician that is identifying multiple fibers 20a-20x. Some or all of the steps of trace identification process 700 (described above with respect to FIG. 7) may be included in unidirectional test procedure 800. Unidirectional test procedure 800 begins at step 804 where test set 120 is attached at one end of a fiber under test, or in the case of FIG. 1, each of fibers 20a-20x of bundle 110. In an exemplary embodiment, twenty four (24) fibers 20a-20x are connected to test set 120. However, if fewer fibers are to be tested, then fewer inputs 160 of test set 120 are to be used with unidirectional test procedure 800. For example, in an alternative embodiment where only 12 fibers are to be tested then only inputs 160a-160l of test set 120 would be required. Although shown using inputs 160a-160l sequentially, fibers 20 may be attached in any order to any open input 160. In an exemplary embodiment, fibers 20a-20x are connected at a first end to test set 120 (shown in FIG. 1 at second hub 32). Control then proceeds to step 806.

In step 806, OTDR 140 is attached at an end of fiber 20 as was used in step 804. OTDR 140 is attached via launch fiber 34. The optical elements are now in place so as to enable measurement via fiber under test 20 using OTDR 140. Control then proceeds to step 810.

In step 810, the length of launch fiber 34 is measured. To verify that unidirectional test procedure 800 is operating properly, a measurement of launch fiber 34 is taken. Although not necessary, such a measurement confirms the connection of OTDR 140 to launch fiber 34 and further confirms that OTDR 140 is at least able to discriminate distances at a short range. Control then proceeds to step 820.

In step 820, the length of fiber under test 20 is measured. Although not necessary to unidirectional test procedure 800, as with step 810, such a measurement confirms the device and fibers are performing as expected. Moreover, while a technician has OTDR 140 attached to the fiber, diagnostic measurements can be performed for length and loss. For example, if the expected length of the fiber under test is outside normal ranges, then it is possible that the technician has attached OTDR 140 to an incorrect fiber or bundle. Moreover, where the fiber under test has loss 550 (see FIG. 5) outside of specifications, then the fiber under test may require repair, replacement, or abandonment. While not necessary to unidirectional test procedure 800, speed of maintenance may be increased by simple measurements taken during fiber identification. Control then proceeds to step 830.

In step 830, the length of lead-in fiber 310 is measured. The length of lead-in fiber 310 is measured by the distance between input event 520 and identification event 524. By taking the measurement of lead-in fiber 310 and verifying the correct length, a technician or diagnostic tool is able to verify that the segment being inspected is indeed the lead-in fiber 310 and that the next segment is identifying fiber 320. Thus, where the length of lead-in fiber is correct, then the user and/or OTDR 140 know that unidirectional test procedure 800 is continuing as expected. Control then proceeds to step 840.

In step 840, the length of identifying fiber 320 is measured. Identifying fiber 320 is of a unique length as compared to other identifying fibers 320 and the length is measured between identification event 524 and termination event 528. Control then proceeds to step 850.

In step 850, identifying fiber 320 is mapped to one of inputs 160a-160x of test set 120. The lengths of identifying fibers 320a-320x are known at the time of manufacture of test set 120. Thus, the lengths may be printed on the housing for test set 120. In an alternative method for mapping identifying fiber 320 to one of inputs 160a-160x, OTDR 140 may be used to directly measure the lengths within identification and may then map a length to an input. Control then proceeds to step 860.

In step 860, the fiber under test is mapped to input 160 determined in step 850. Thus, one end of the fiber is attached to OTDR 140 and the other end is attached to known input 160. Therefore, the identity of the fiber under test is known end-to-end and labels or other identifying marks (e.g., numbers) may be applied for ready identification in the future. Control then proceeds to step 870.

In step 870, a check is performed by a technician or OTDR 140 to determine whether all fibers in bundle 110 have been identified. If each and every fiber 20 has been identified, then unidirectional test procedure 800 ends because there are no more fibers to identify. If more fibers require identification, control transfers to step 880.

In step 880, a new fiber under test is selected. The fiber selected is a fiber that has not previously been identified. Thus, selection is based solely from a set of unidentified fibers. Once a fiber has been identified, it is removed from the list of unidentified fibers. However, if a technician desires to again identify a fiber for verification purposes, a fiber already identified may be chosen. Control then proceeds to step 806 where the selected fiber under test begins the identification process.

In alternative embodiments, the methods and processes described herein may be performed by a technician, or may be performed in whole, or in part, by an OTDR, or a measurement device having an automation system. Thus, in an alternative embodiment, an intelligent OTDR 140 (e.g., an OTDR 140 that is capable of being programmed and detecting events) may be used to automatically test a fiber and identify the fiber having test set 120 connected at a distal end. A technician need only attach test set 120 at one end of bundle 110 and attach OTDR 140 at a fiber on the other end. The automated OTDR 140 would then perform the methods described herein to identify the fiber and display the mapping number, e.g., input number, to the technician. Moreover, such a system would have preprogrammed lengths for Identification fibers 200a-200x and in particular for identifying fibers 320a-320x. Therefore, when an identifying fiber 320 is measured, the OTDR 140 would then look up the input 160 number from a table.

Figure 9:
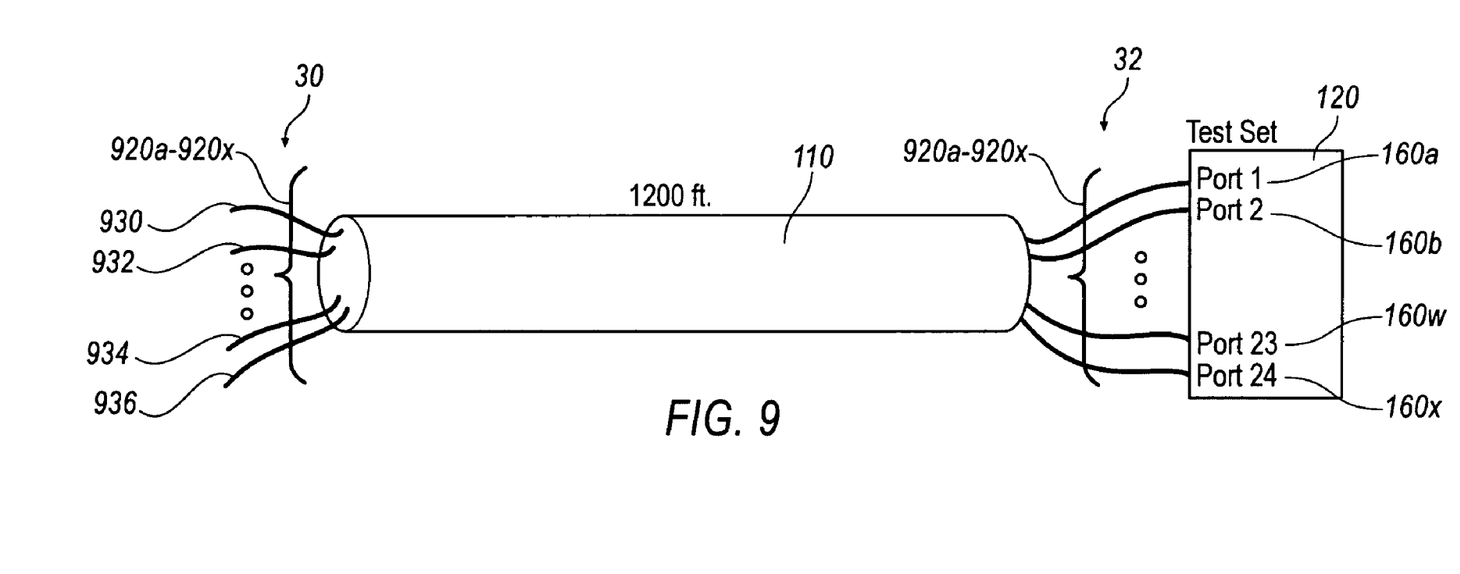
FIG. 9 shows a resulting number of identified fibers of the system of FIG. 1.

FIG. 9 illustrates testing and mapping of the unknown fibers at first hub 30 to determine their connection at second hub 32. Fibers 920a-920x of bundle 110 are presented at one end at first hub 30 as a first fiber 930, a second fiber 932, a third fiber 934, and a fourth fiber 936. The other ends of fibers 930, 932, 934, 936 are connected to second hub 32 and are the same fibers 920a-920x of bundle 110. At second hub 32, fibers 920a-920x are unknown (i.e., not identified) and are randomly connected to test set 120 at inputs 160a-160x. Using the systems and methods described in detail above, a technician measures the identifying fibers 320a, 320b, 320r, and 320x (shown in detail with respect to FIG. 3A) to determine the connectivity of fibers 920a-920x.

For example, first unknown fiber 930 is measured as having an identifying fiber 320 length of one hundred (100) feet (signifying identifying fiber 320a). Thus, it is now known that first unknown fiber 930 is connected to input 160a of test set 120.

Second unknown fiber 932 is measured as having an identifying fiber 320 length of one hundred twenty (120) feet (signifying identifying fiber 320b). Thus, it is now known that second unknown fiber 932 is connected to input 160b of test set 120.

Third unknown fiber 934 is measured as having an identifying fiber 320 length of three hundred twenty (320) feet (signifying identifying fiber 320r). Thus, it is now known that third unknown fiber 934 is connected to input 160r of test set 120.

Fourth unknown fiber 936 is measured as having an identifying fiber 320 length of five hundred sixty (560) feet (signifying identifying fiber 320x). Thus, it is now known that fourth unknown fiber 936 is connected to input 160x of test set 120. In this way, a technician has identified the fibers 930-936 of bundle 110 using the systems and methods described herein. FIG. 9 generally illustrates how fibers are mapped using known identifying fiber 320 lengths in system 100.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. For example, although embodiments are described above with reference to bundle 110, it should be understood that a fiber under test could be included in embodiments having a single fiber, multiple fibers in a bundle 110, multiple bundles 110, and bundles 110 along with individual unknown fibers 20. Further, although embodiments used herein disclose use of OTDR 140, it is to be understood that some other measuring device capable of measuring identifying fiber 320 may be used.

The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary technical meanings unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
    a unique marker configured to engage an unknown optical fiber; and
    an identification device configured to selectively engage said unknown optical fiber and detect said unique marker.

2. The system of claim 1, further comprising a plurality of unique markers each configured to engage one of a plurality of unknown optical fibers, said identification device configured to selectively engage at least one of said plurality of unknown fibers and identify at least one of said unique markers.

3. The system of claim 2, wherein said plurality of unique markers comprises a plurality of predetermined unequal lengths of optical fiber.

4. The system of claim 1, wherein said unique marker comprises a predetermined length of optical fiber.

5. The system of claim 4, wherein:
    said predetermined length of optical fiber further comprises a first end and a second end; and
    said unique marker further comprises an event marker between said unknown optical fiber and said first end.

6. The system of claim 5, wherein said event marker is provided by said engagement of said predetermined length of optical fiber and said unknown optical fiber.

7. The system of claim 5, wherein said event marker is provided as an optical element engaged between said first end and said unknown optical fiber.

8. The system of claim 5, wherein said unique marker further comprises a terminator engaged with said second end of said predetermined length of optical fiber.

9. The system of claim 4, wherein said unique marker further comprises an event marker and a lead-in optical fiber, said lead-in optical fiber having a proximal and distal end, wherein said event marker engages with said predetermined length of optical fiber and said distal end of said lead-in optical fiber, said proximal end of said lead-in optical fiber engaging with said unknown optical fiber.

10. The system of claim 1, wherein said identification device is able to distinguish said unique marker from a normal splice of said unknown optical fiber.

11. The system of claim 1, wherein said identification device is an optical time domain reflectometer (OTDR).

12. A system comprising:
    an identification component having a unique characteristic, a proximal end, and a distal end;
    a marker optically engaged with said proximal end;
    an unknown fiber having a first end and a second end, said second end engaged with said marker; and
    an identification device selectively engaged with said first end of said unknown fiber, said identification device selectively identifying said unique characteristic via said unknown fiber.

13. The system of claim 12, wherein said system further comprises:
    a plurality of identification components, each of said plurality of identification components having a unique characteristic from one another; and
    a plurality of unknown fibers, wherein said identification device selectively engages with at least one of said plurality of unknown fibers, said identification device selectively identifying at least one of said unique characteristics of said plurality of identification components via said selectively engaged unknown fiber.

14. The system of claim 12, wherein said identification component comprises a predetermined length of optical fiber.

15. The system of claim 12, wherein said unique characteristic is a predetermined length of said identification component, said identification device identifying said unique characteristic as a measurement from said marker to said distal end.

16. The system of claim 12, wherein said marker is provided by said engagement of said second end of said unknown fiber to said proximal end of said identification component.

17. The system of claim 12, wherein said marker is configured as an attenuator.

18. The system of claim 12, wherein said identification component is terminated at said distal end.

19. The system of claim 12, wherein said identification device is an optical time domain reflectometer (OTDR).

20. A method comprising:
    attaching a unique identifier to an unknown optical fiber;
    engaging an identification device to said unknown optical fiber; and
    identifying said unique identifier via said unknown optical fiber.

21. The method of claim 20, wherein said step of identifying further comprises:
    determining a characteristic of said unique identifier.

22. The method of claim 20, wherein said step of determining a characteristic further comprises measuring a predetermined length of said unique identifier.

23. The method of claim 20, wherein said step of measuring a predetermined length of said unique identifier further comprises measuring a distance between a proximal end and a distal end of said unique identifier.

24. The method of claim 20, wherein said step of measuring said distance further comprises:
    identifying said proximal end of said unique identifier by identifying a marker;
    identifying said distal end of said unique identifier; and
    measuring a distance between said marker and said distal end of said unique identifier.

25. The method of claim 20, wherein:
    said attaching step further comprises attaching a plurality of unique identifiers to a plurality of unknown optical fibers;
    said engaging step further comprises selectively attaching said identification device to one of said plurality of unknown optical fibers; and
    said identifying step further comprises determining one of said plurality of unique identifiers via said engaged unknown fiber.

* * * * *